United States Patent [19]
Royer et al.

[11] Patent Number: 5,893,357
[45] Date of Patent: Apr. 13, 1999

[54] PORTABLE COOKING SYSTEM

[76] Inventors: Raymond Royer, 16306 New Bedford, Crosby, Tex. 77532; Clifford Breaux, 15306 #A Market St., Crosby, Tex. 77530

[21] Appl. No.: 08/880,214

[22] Filed: Jun. 23, 1997

[51] Int. Cl.⁶ .................................. F24C 1/16; F24C 1/00
[52] U.S. Cl. ................. 126/9 R; 126/25 R; 126/39 BA; 392/307
[58] Field of Search ..................... 126/9 R, 25 R, 126/29, 26, 9 B, 39 BA, 41 R; 392/307

[56] References Cited

U.S. PATENT DOCUMENTS

| | | | |
|---|---|---|---|
| 3,094,113 | 6/1963 | Avila | 126/9 R |
| 3,176,676 | 4/1965 | Caldwell | 126/9 R |
| 4,548,193 | 10/1985 | Marogil | 126/30 |
| 4,630,593 | 12/1986 | Gremillion | 126/9 R |
| 4,724,753 | 2/1988 | Neymann et al. | 99/339 |
| 5,065,735 | 11/1991 | Bourgeois et al. | 126/40 |
| 5,558,008 | 9/1996 | Jenkins | 99/340 |

*Primary Examiner*—Ira S. Lazarus
*Assistant Examiner*—David Lee
*Attorney, Agent, or Firm*—Joseph N. Breaux

[57] ABSTRACT

A portable cooking system that includes a detachable base, a support pole assembly, a detachable charcoal holder, a circular grating, a removable cover/lid, a detachable gas burner assembly, a detachable electric burner assembly, a washer shaped flame diffuser member, a cooking wok, and a cooking system carrying case.

6 Claims, 3 Drawing Sheets

FIG. 2

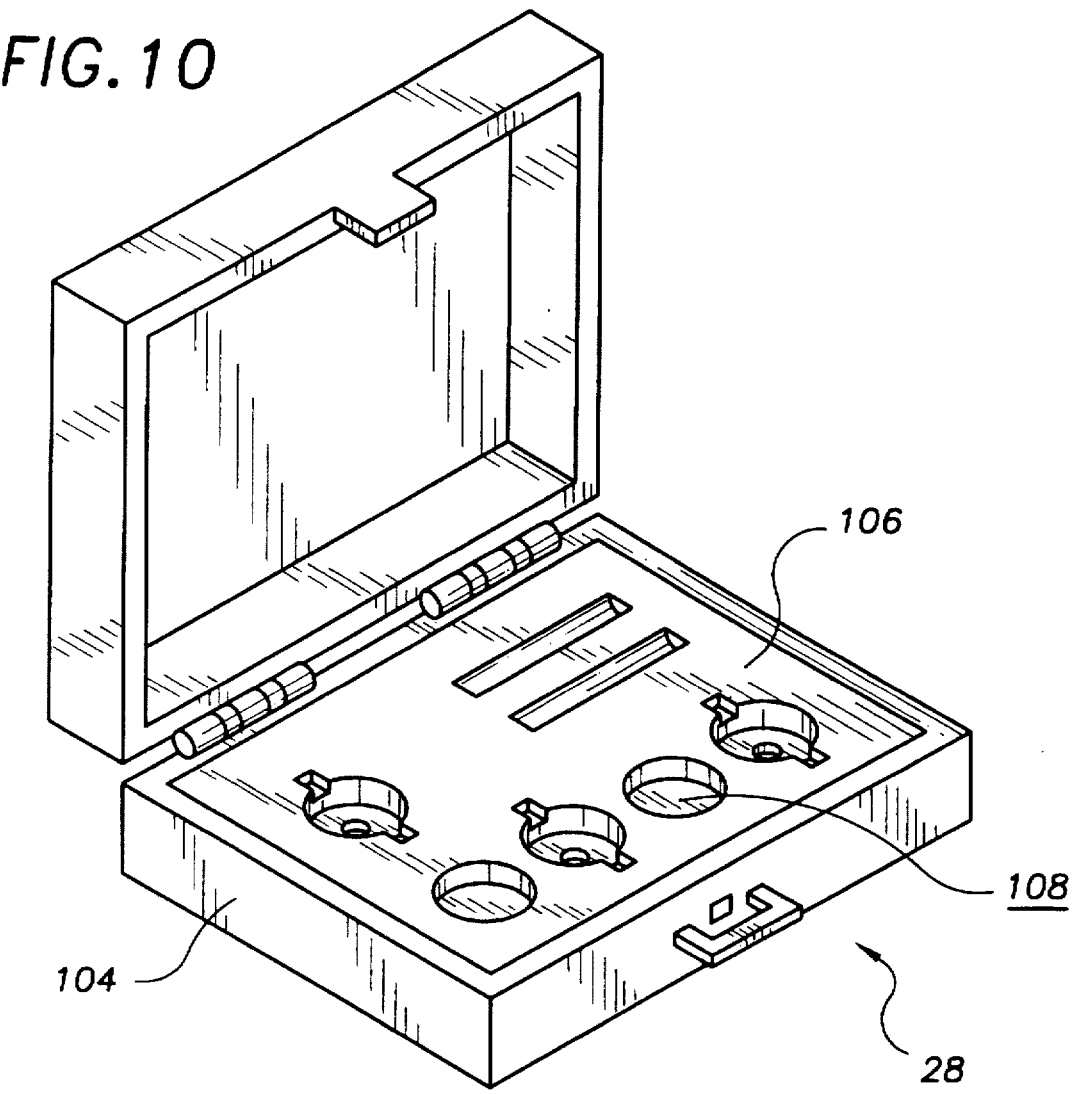

5,893,357

1

PORTABLE COOKING SYSTEM

TECHNICAL FIELD

The present invention relates to portable cooking devices and more particularly to a portable cooking system that includes a detachable base, a two-part telescoping support pole assembly, a detachable charcoal holder, a circular grating, a removable cover/lid, a detachable gas burner assembly, a detachable electric burner assembly, a washer shaped flame diffuser member, a cooking wok, and a cooking system carrying case; and wherein the detachable base has an internally threaded pole attachment bore; the two-part telescoping support pole assembly includes a lower pole member with an externally threaded lower base connecting end compassionately threaded to engage the threaded pole attachment bore of the detachable base and a number of lower height adjustment holes spaced along the length thereof, an upper pole member having a lower pole receiving passageway provided therethrough that is sized to receiving the lower pole member in a telescoping relationship and further having a number of upper height adjustment holes, and two locking pins that are each positionable through a pair of aligned upper and lower height adjustment holes; the detachable charcoal holder has a charcoal holder housing forming a semi-spherical shaped charcoal holding cavity, two handles extending from the exterior of the charcoal holder housing, and a charcoal holder support pole attachment fitting that is slidably positionable over a top end of the upper pole member, the charcoal holder support pole attachment fitting having a charcoal holder locking pin receiving aperture positionable in alignment with at least one upper height adjustment hole and sized to receive therethrough one of the locking pins; the circular grating includes a grating surface member having spaced, downwardly protruding grating support legs that are located in a manner to allow simultaneous insertion of a portion of each of the grating support legs into the semi-spherical shaped charcoal holding cavity; the removable cover/lid has a dome shaped top cover member having a lower lid perimeter lip, a handle extending from the dome shaped top cover member, a user adjustable vent opening formed through the dome shaped top cover member and a thermometer mounted on the dome shaped top cover member, the lower lid perimeter lip of the dome shaped top cover member being positionable into the semi-spherical shaped charcoal holding cavity; the detachable gas burner assembly includes a ring shaped gas manifold, a number of spaced gas burners that are positioned on an upwardly directed surface of the gas manifold, a gas supply fitting that is in connection with a manifold passageway of the gas manifold and a gas burner support pole attachment fitting that is slidably positionable over a top end of the upper pole member, the gas burner support pole attachment fitting having a gas burner locking pin receiving aperture that is positionable in alignment with at least one upper height adjustment hole and that is sized to receive therethrough one of the locking pins; the detachable electric burner assembly includes an electric heating element, a heating element housing partially enclosing the electric heating element, an electric plug connector in electrical connection with the electric heating element and a support pole attachment fitting that, is slidably positionable over a top end of the upper pole member, the electric burner assembly support pole attachment fitting having a electric burner assembly locking pin receiving aperture that is positionable in alignment with at least one upper height adjustment hole and that is sized to receive therethrough one of the locking pins; the washer shaped flame diffuser member is

2 constructed of steel and has a central circular opening and a number of circular shaped flame passageways; the cooking wok includes a wok member with an internally positioned, inwardly extending, circumferential cover/lid support ledge; and the system carrying case includes a two-part case housing and a molded foam insert that is provided with a sufficient number of form fitting cooking system element storage cavities to receive and hold the detachable base, the two-part telescoping support pole assembly, the detachable charcoal holder, the circular grating, the removable cover/lid, the detachable gas burner assembly, the detachable electric burner assembly, the washer shaped flame diffuser member, and the cooking wok of the portable cooking system.

BACKGROUND OF THE INVENTION

Outdoor cooking is a popular pastime that encompasses a large number of cooking techniques such as smoking, grilling, and stir frying. Because these cooking techniques utilize a number of heat sources such as charcoal, cas and electric, it would be a benefit to have a portable cooking system that can be used for cooking out of doors that provides a charcoal supplied heat source, an electric supplied heat source and a gas supplied heat source that are each detachably connectable to a base assembly. Because different individuals can enjoy cooking at different heights, it would be a further benefit to have a portable cooking system that included a base assembly that includes a detachable base and a telescoping support pole assembly that is detachably securable between the detachable base and a charcoal supplied heat source, an electric supplied heat source or a gas supplied heat source. Because it is difficult to maintain all of the elements of a multi-element portable cooking system together, it would be a further benefit to have a portable cooking system that included a system carrying case for holding and transporting all of the portable cooking system elements.

SUMMARY OF THE INVENTION

It is thus an object of the invention to provide a portable cooking system that includes a charcoal supplied heat source, an electric supplied heat source and a gas supplied heat source that are each detachably connectable to a base assembly.

It is a further object of the invention to provide a portable cooking system that includes a detachable base and a telescoping support pole assembly that is detachably securable between the detachable base and a charcoal supplied heat source, an electric supplied heat source or a gas supplied heat source.

It is a still further object of the invention to provide a portable cooking system that includes a system carrying case for holding and transporting all of the portable cooking system elements.

It is a still further object of the invention to provide a portable cooking system that includes a detachable base, a two-part telescoping support pole assembly, a detachable charcoal holder, a circular grating, a removable cover/lid, a detachable gas burner assembly, a detachable electric burner assembly, a washer shaped flame diffuser member, a cooking wok, and a cooking system carrying case.

It is a still further object of the invention to provide a portable cooking system that accomplishes some or all of The above objects in combination.

Accordingly, a portable cooking system that includes a detachable base, a two-part telescoping support pole assembly, a detachable charcoal holder, a circular grating, a removable cover/lid, a detachable gas burner assembly, a detachable electric burner assembly, a washer shaped flame diffuser member, a cooking wok, and a cooking system carrying case; and wherein the detachable base has an internally threaded pole attachment bore; the two-part telescoping support pole assembly includes a lower pole member with an externally threaded lower base connecting end compassionately threaded to engage the threaded pole attachment bore of the detachable base and a number of lower height adjustment holes spaced along the length thereof, an upper pole member having a lower pole receiving passageway provided therethrough that is sized to receiving the lower pole member in a telescoping relationship and further having a number of upper height adjustment holes, and two locking pins that are each positionable through a pair of aligned upper and lower height adjustment holes; the detachable charcoal holder has a charcoal holder housing forming a semi-spherical shaped charcoal holding cavity, two handles extending from the exterior of the charcoal holder housing, and a charcoal holder support pole attachment fitting that is slidably positionable over a top end of the upper pole member, the charcoal holder support pole attachment fitting having a charcoal holder locking pin receiving aperture positionable in alignment with at least one upper height adjustment hole and sized to receive therethrough one of the locking pins; the circular grating includes a grating surface member having spaced, downwardly protruding grating support legs that are located in a manner to allow simultaneous insertion of a portion of each of the grating support legs into the semi-spherical shaped charcoal holding cavity; the removable cover/lid has a dome shaped top cover member having a lower lid perimeter lip, a handle extending from the dome shaped top cover member, a user adjustable vent opening formed through the dome shaped top cover member and a thermometer mounted on the dome shaped top cover member, the lower lid perimeter lip of the dome shaped top cover member being positionable into the semi-spherical shaped charcoal holding cavity; the detachable gas burner assembly includes a ring shaped gas manifold, a number of spaced gas burners that are positioned on an upwardly directed surface of the gas manifold, a gas supply fitting that is in connection with a manifold passageway of the gas manifold and a gas burner support pole attachment fitting that is slidably positionable over a top end of the upper pole member, the gas burner support pole attachment fitting having a gas burner locking pin receiving aperture that is positionable in alignment with at least one upper height adjustment hole and that is sized to receive therethrough one of the locking pins; the detachable electric burner assembly includes an electric heating element, a heating element housing partially enclosing the electric heating element, an electric plug connector in electrical connection with the electric heating element and a support pole attachment fitting that is slidably positionable over a top end of the upper pole member, the electric burner assembly support pole attachment fitting having a electric burner assembly locking pin receiving aperture that is positionable in alignment with at least one upper height adjustment hole and that is sized to receive therethrough one of the locking pins; the washer shaped flame diffuser member is constructed of steel and has a central circular opening and a number of circular shaped flame passageways; the cooking wok includes a wok member with an internally positioned, inwardly extending, circumferential cover/lid support ledge; and the system carrying case includes a two-part case housing and a molded foam insert that is provided with a sufficient number of form fitting cooking system element storage cavities to receive and hold the detachable base, the two-part telescoping support pole assembly, the detachable charcoal holder, the circular grating, the removable cover/lid, the detachable gas burner assembly, the detachable electric burner assembly, the washer shaped flame diffuser member, and the cooking wok of the portable cooking system.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 2 is a perspective view of an exemplary embodiment of the two-part telescoping support pole assembly of the portable cooking system of the present invention showing the lower pole member with the externally threaded lower base connecting end, the upper pole member, the height adjustment holes in the upper and lower pole members, and the two locking pins.

FIG. 10 is a perspective view of an exemplary embodiment of system carrying case of the portable cooking system of the present invention showing the two-part case housing and the molded foam insert provided with form fitting cooking system element storage cavities.

DESCRIPTION OF THE EXEMPLARY EMBODIMENT

Figure 5:
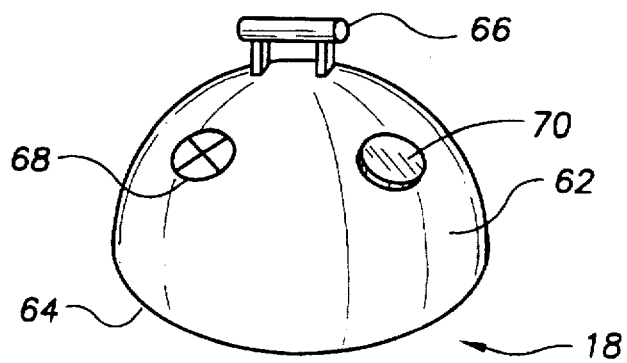
FIG. 5 is a perspective view of an exemplary embodiment of the removable cover/lid of the portable cooking system of the present invention showing the dome shaped top cover member, the handle, the user adjustable vent opening and the thermometer.

FIGS. 1–10 illustrate the elements of an exemplary embodiment of the portable cooking system of the present invention. The exemplary cooking system includes a detachable base, generally designated 10 (FIG. 1); a two-part telescoping support pole assembly, generally designated 12 (FIG. 2); a detachable charcoal holder, generally designated 14 (FIG. 3); a circular grating, generally designated 16 (FIG. 4); a removable cover/lid, generally designated 18 (FIG. 5); a detachable gas burner assembly, generally designated 20 (FIG. 6); a detachable electric burner assembly, generally designated 22 (FIG. 7); a washer shaped flame diffuser member, generally designated 24 (FIG. 8); a cooking wok, generally designated 26 (FIG. 9); and a cooking system carrying case, generally designated 28 (FIG. 10).

Figure 1:
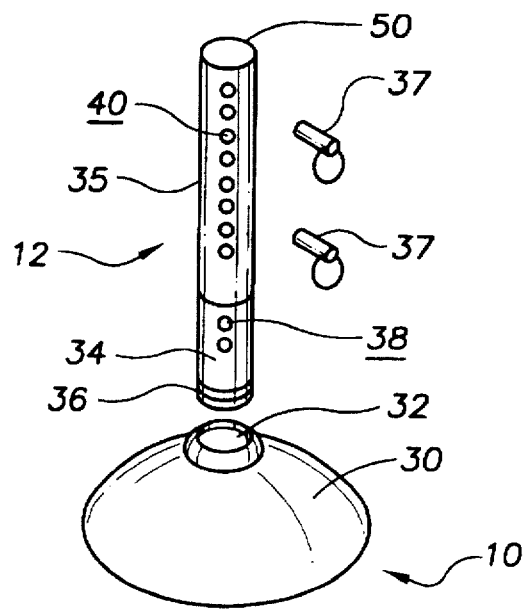
FIG. 1 is a perspective view of an exemplary embodiment of the detachable base of the portable cooking system of the present invention showing the internally threaded pole attachment bore.

With reference to FIG. 1, detachable base 10 includes a dome shaped cast steel base member 30 that is provided with an internally threaded pole attachment bore 32.

With reference to FIG. 2, two-part telescoping support pole assembly 12 includes a tubular lower pole member 34, a tubular upper pole member 35, and two identical locking pins 37. Tubular lower pole member 34 has an externally threaded lower base connecting end 36 that is compassionately threaded to engage threaded pole attachment bore 32 of detachable base 10. Lower pole member 34 also includes a number of lower height adjustment holes 38 spaced along the length thereof. Tubular upper pole member 35 has a lower pole receiving passageway provided therethrough that has an internal diameter greater than the external diameter of lower pole member 34 to allow lower pole member 34 to slide into upper pole member 35 in a telescoping fashion. Upper pole member also includes a number of upper height adjustment holes 40. The total length of two-part telescoping support pole assembly 12 is adjusted by aligning one of the upper height adjustment hole 40 with one of the lower height adjustment holes 38 and inserting a locking pin 37 therethrough.

Figure 3:
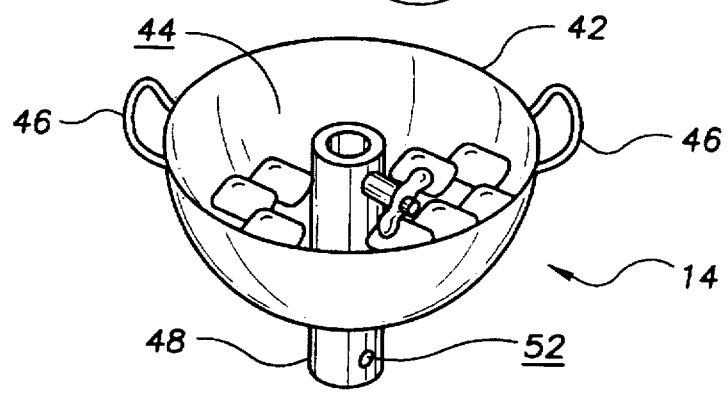
FIG. 3 is a perspective view of an exemplary embodiment of the detachable charcoal holder of the portable cooking system of the present invention showing the semi-spherical shaped charcoal holding cavity, the handles, and the support pole attachment fitting with the locking pin receiving aperture.

With reference to FIG. 3, detachable charcoal holder 14 is constructed of stainless steel and has a charcoal holder housing 42 that is shaped to form a semi-spherical shaped charcoal holding cavity 44, two U-shaped handles 46 extending from the exterior of charcoal holder housing 42, and a charcoal holder support pole attachment fitting 48 that is slidably positionable over a top end 50 (FIG. 2.) of upper pole member 35 (FIG. 2). Charcoal holder support pole attachment fitting 48 has a charcoal holder locking pin receiving aperture 52 that is positionable in alignment with at least one upper height adjustment hole 40 and that is sized to receive therethrough one of the two locking pins 37 (FIG. 2).

Figure 4:
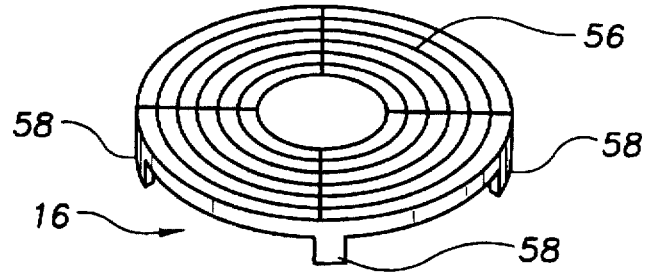
FIG. 4 is a perspective view of an exemplary embodiment of circular grating of the portable cooking system of the present invention showing three of the four spaced, downwardly protruding grating support legs.

With reference to FIG. 4, circular grating 16 is constructed from stainless steel and includes a grating surface member 56 that provides a grilling surface and four identical, spaced, downwardly protruding grating support legs 58 (only three shown). Grating support legs 58 are located a distance from the center of circular grating 16 that is sufficient to allow simultaneous insertion of a portion of each of the four identical grating support legs 58 into semi-spherical shaped charcoal holding cavity 44 (FIG. 3).

With reference to FIG. 5, removable cover/lid is constructed from stainless steel and has a dome shaped top cover member 62 having a circular lower lid perimeter lip 64, a wooden handle 66 extending from the top center of dome shaped top cover member 62, a user adjustable vent opening 68 formed through dome shaped top cover member 62 and a thermometer 70 mounted on dome shaped top cover member 62. Circular lower lid perimeter lip 64 of dome shaped top cover member 62 is positionable into semi-spherical shaped charcoal holding cavity 44 (FIG. 3).

Figure 6:
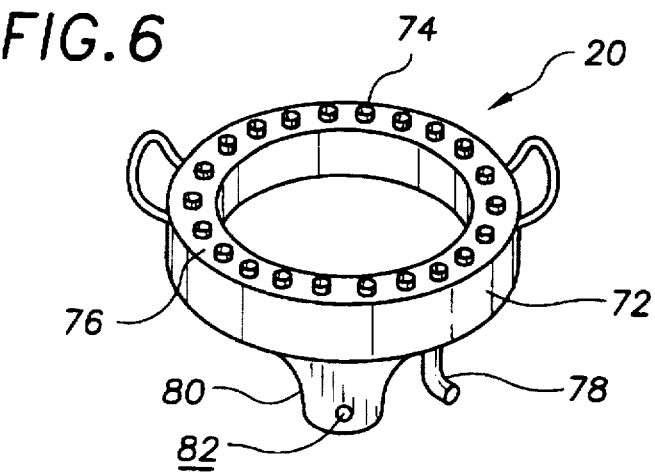
FIG. 6 is a perspective view of an exemplary embodiment of the detachable gas burner assembly of the portable cooking system of the present invention showing the ring shaped gas manifold, the spaced gas burners positioned on the upwardly directed surface of the gas manifold, the gas supply fitting in connection with the manifold passageway of the gas manifold and the support pole attachment fitting with the locking pin receiving aperture.

With reference to FIG. 6, detachable gas burner assembly 20 includes a hollow, ring shaped gas manifold 72, a number of spaced gas burners 74 that are positioned on an upwardly directed surface 76 of gas manifold 72, a conventional gas supply fitting 78 that is in connection with the hollow interior manifold passageway of gas manifold 72 and a gas burner support pole attachment fitting 80 that is slidably positionable over a top end 50 (FIG. 2) of upper pole member 35 (FIG. 2). Gas burner support pole attachment fitting 80 is provided with a gas burner locking pin receiving aperture 82 that is positionable in alignment with at least one upper height adjustment hole 40 (FIG. 2) and that is sized to receive therethrough one of the the two locking pins 37 (FIG. 2).

Figure 7:
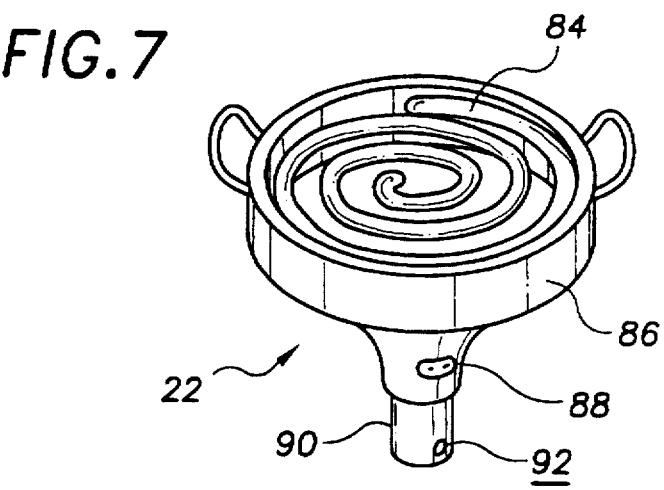
FIG. 7 is a perspective view of an exemplary embodiment of the detachable electric burner assembly of the portable cooking system of the present invention showing the electric heating element, the heating element housing, the electric plug connector and the support pole attachment fitting with the locking pin receiving aperture.

With reference to FIG. 7, detachable electric burner assembly 22 includes a conventional electric heating element 84, a stainless steel heating element housing 86 that partially encloses electric heating element 84, an electric plug connector 88 in electrical connection with electric heating element 84 and a support pole attachment fitting 90 that is slidably positionable over a top end 50 (FIG. 2) of upper pole member 35 (FIG. 2). Electric burner assembly support pole attachment fitting 90 has an electric burner assembly locking pin receiving aperture 92 that is positionable in alignment with at least one upper height adjustment hole 40 (FIG. 2) and that is sized to receive therethrough one of the two locking pins 37 (FIG. 2).

Figure 8:
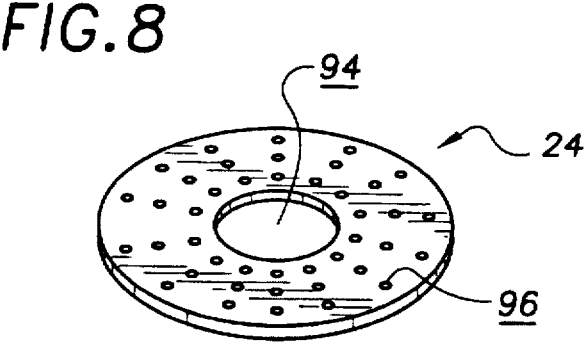
FIG. 8 is a perspective view of an exemplary embodiment of the washer shaped flame diffuser member of the portable cooking system of the present invention showing the steel, washer shaped flame diffuser member with the central opening and a number of circular shaped flame passageways.

With reference to FIG. 8, washer shaped flame diffuser member 24 is constructed of steel and has a central circular opening 94 and a number of circular shaped flame passageways 96, in use, flame diffuser member 24 is positioned over detachable charcoal holder (FIG. 3); circular grating 16 (FIG. 4); detachable gas burner assembly 20 (FIG. 6); and detachable electric burner assembly 22 (FIG. 7) to moderate the heat used for cooking.

Figure 9:
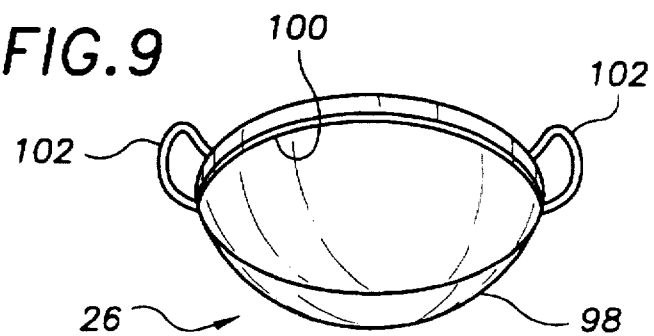
FIG. 9 is a perspective view of an exemplary embodiment of the cooking wok of the portable cooking system of the present invention showing the stainless steel wok member with the internally positioned, Inwardly extending, circumferential cover/lid support ledge.

With reference to FIG. 9, cooking wok 26 is constructed from stainless steel arid includes a wok member 98 having an internally positioned, inwardly extending, circumferential cover/lid support ledge 100 and two U-shaped handles 102.

With reference to FIG. 10, system carrying case includes a two-part molded plastic case housing 104 and a molded foam insert 106 that is provided with a sufficient number of form fitting cooking system element storage cavities 108 to receive and hold detachable base 10 (FIG. 1), two-part telescoping support pole assembly 12 (FIG. 2), detachable charcoal holder 14 (FIG. 3), circular grating 16 (FIG. 4), removable cover/lid 18 (FIG. 5), detachable gas burner assembly 20 (FIG. 6), detachable electric burner assembly 22 (FIG. 7), washer shaped flame diffuser member 24 (FIG. 8), and cooking wok 26 (FIG. 9). In this embodiment, one element storage cavity 10 is adapted to receive and hold detachable base 10 (FIG. 1) and removable cover/lid 18 (FIG. 5); and one element storage cavity 108 is adapted to receive circular grating 16 (FIG. 4), washer shaped flame diffuser member 24 (FIG. 8), and cooking wok 26 (FIG. 9)

It can be seen from the preceding description that a portable cooking system has been provided that includes a charcoal supplied heat source, an electric supplied heat source and a gas supplied heat source that are each detachably connectable to a base assembly; that includes a detachable base and a telescoping support pole assembly that is detachably securable between the detachable base and a charcoal supplied heat source, an electric supplied heat source or a gas supplied heat source; that includes a system carrying case for holding and transporting all of the portable cooking system elements; and that includes a detachable base, a two-part telescoping support pole assembly, a detachable charcoal holder, a circular grating, a removable cover/lid, a detachable gas burner assembly, a detachable electric burner assembly, a washer shaped flame diffuser member, a cooking wok, and a cooking system carrying case.

It is noted that the embodiment of the portable cooking system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

what is claimed is:

1. A portable cooking system comprising:

detachable base;

a support pole assembly having a top end provided with a plurality of upper height adjustment holes therethrough;

a locking pin;

a detachable charcoal holder;

a circular grating;

a removable cover/lid;

a detachable gas burner assembly;

a detachable electric burner assembly;

a cooking wok; and a cooking system carrying case;

said detachable base being attachable to said support pole assembly;

said detachable charcoal holder having a charcoal holder housing forming a semi-spherical shaped charcoal holding cavity, two handles extending from an exterior surface of said charcoal holder housing, and a charcoal holder attachment fitting that is slidably positionable over said top end of said support pole assembly, said charcoal holder attachment fitting having a charcoal holder locking pin receiving aperture positionable in alignment with at least one upper height adjustment hole and sized to receive therethrough said locking pins;

said circular grating including a grating surface member having spaced, downwardly protruding grating support legs that are located in a manner to allow simultaneous insertion of a portion of each of said grating support legs into said semi-spherical shaped charcoal holding cavity;

said removable cover/lid having a dome shaped top cover member having a lower lid perimeter lip, a handle extending from said dome shaped top cover member, a user adjustable vent opening formed through said dome shaped top cover member and a thermometer mounted on said dome shaped top cover member, said lower lid perimeter lip of said dome shaped top cover member being positionable into said semi-spherical shaped charcoal holding cavity;

said detachable gas burner assembly including a ring shaped gas manifold, a number of spaced gas burners that are positioned on an upwardly directed surface of said gas manifold, a gas supply fitting that is in connection with a manifold passageway of said gas manifold and a gas burner assembly attachment fitting that is slidably positionable over said top end of said support pole assembly, said gas burner assembly attachment fitting having a gas burner locking pin receiving aperture that is positionable in alignment with at least one upper height adjustment hole and that is sized to receive therethrough said locking pin;

said detachable electric burner assembly including an electric heating element, a heating element housing partially enclosing said electric heating element, an electric plug connector in electrical connection with said electric heating element and an electric burner assembly attachment fitting that is slidably positionable over said top end of said support pole assembly, said electric burner assembly attachment fitting having a electric burner assembly locking pin receiving aperture that is positionable in alignment with at least one upper height adjustment hole and that is sized to receive therethrough said locking pin;

said cooking wok including a wok member with an internally positioned, inwardly extending, circumferential cover/lid support ledge;

said carrying case including a two-part case housing and a molded foam insert that is provided with a sufficient number of form fitting cooking system element storage cavities to receive and hold said detachable base, said support pole assembly, said detachable charcoal holder, said circular grating, said removable cover/lid, said detachable gas burner assembly, said detachable electric burner assembly, and said cooking wok of said portable cooking system.

2. The portable cooking system of claim 1, further including:

a washer shaped flame diffuser member constructed of steel and sized to cover said ring shaped gas manifold of said detachable gas burner assembly.

3. The portable cooking system of claim 2, wherein:

said washer shaped flame diffuser member has a central circular opening and a number of circular shaped flame passageways.

4. The portable cooking system of claim 1 wherein:

said wok is constructed from stainless steel.

5. The portable cooking system of claim 4, further including:

a washer shaped flame diffuser member constructed of steel and sized to cover said ring shaped gas manifold of said detachable gas burner assembly.

6. The portable cooking system of claim 5, wherein:

said washer shaped flame diffuser member has a central circular opening and a number of circular shaped flame passageways.

* * * * *